US008291568B2

(12) United States Patent
Barneman

(10) Patent No.: US 8,291,568 B2

(45) Date of Patent: Oct. 23, 2012

(54) METHOD OF INSTALLING AN ELEVATOR

(75) Inventor: Hakan Barneman, Solna (SE)

(73) Assignee: Kone Corporation, Helsinki (FI)

(*) Notice: Subject to any disclaimer, the term of this patent is extended or adjusted under 35 U.S.C. 154(b) by 569 days.

(21) Appl. No.: 12/565,139

(22) Filed: Sep. 23, 2009

(65) Prior Publication Data

US 2010/0133048 A1 Jun. 3, 2010

Related U.S. Application Data

(60) Provisional application No. 61/118,560, filed on Nov. 28, 2008.

(51) Int. Cl.

*B23P 11/00* (2006.01)
*B66B 7/00* (2006.01)
*B66B 9/00* (2006.01)

(52) U.S. Cl. .............. 29/429; 29/428; 29/431; 187/414; 187/900; 52/30

(58) Field of Classification Search .................... 29/429, 29/428, 430, 431; 187/414, 408, 900, 406, 187/407, 401; 52/30

See application file for complete search history.

(56) References Cited

U.S. PATENT DOCUMENTS 3,851,736 A * 12/1974 Westlake et al. ............. 52/745.2
4,345,671 A * 8/1982 Tosato et al. ................. 52/745.2
5,000,292 A * 3/1991 Chapelain et al. ............ 187/408
5,014,822 A * 5/1991 Chapelain et al. ............ 187/408
5,065,843 A * 11/1991 Richards ....................... 187/408
5,230,404 A 7/1993 Klein
6,138,797 A * 10/2000 Pettersson et al. ............ 187/286
6,196,356 B1 * 3/2001 Sneed ........................... 187/408
6,357,556 B1 * 3/2002 Pettersson et al. ............ 187/414
6,364,067 B1 * 4/2002 Glassey et al. ................ 187/408
6,422,352 B1 * 7/2002 Pettersson et al. ............ 187/408
6,857,508 B2 * 2/2005 Miller et al. .................. 187/401
7,137,485 B2 * 11/2006 Barneman et al. ............ 187/408
7,559,409 B2 * 7/2009 Barneman et al. ............ 187/408
7,562,744 B2 * 7/2009 Mustalahti et al. ........... 187/254
7,624,848 B2 * 12/2009 Fischer ......................... 187/414
7,635,049 B2 * 12/2009 Van Der Meijden et al. . 187/401
7,665,582 B2 * 2/2010 Lindh ........................... 187/401
7,775,325 B2 * 8/2010 Liebetrau et al. ............. 187/254
8,118,138 B2 * 2/2012 Aulanko et al. .............. 187/264
8,141,684 B2 * 3/2012 Bjorni et al. .................. 187/264
8,186,130 B2 * 5/2012 Van Der Meijden et al. .......................... 52/745.17
2002/0066622 A1 * 6/2002 Pettersson et al. ............ 187/414
2002/0148689 A1 * 10/2002 Pettersson et al. ............ 187/408

(Continued)

FOREIGN PATENT DOCUMENTS

JP 04116079 A * 4/1992

(Continued)

*Primary Examiner* — Essama Omgba

(74) *Attorney, Agent, or Firm* — Birch, Stewart, Kolasch & Birch, LLP

(57) ABSTRACT

A method in the installation of an elevator includes arranging a movable platform structure in the bottom end of the elevator hoistway with a temporary hoisting appliance in the elevator hoistway. The movable platform structure is lifted in the elevator hoistway with the temporary hoisting appliance. The final hoisting machine of the final elevator is installed from the platform structure and the final hoisting roping of the elevator is installed. The movable platform structure can be the final elevator car or at least a part of the final elevator car.

29 Claims, 3 Drawing Sheets

U.S. PATENT DOCUMENTS

| | | | | |
|---|---|---|---|---|
| 2005/0275161 | A1 | 12/2005 | Fischer | |
| 2006/0243539 | A1 * | 11/2006 | Cruz et al. | 187/408 |
| 2008/0053756 | A1 * | 3/2008 | Gremaud | 187/276 |
| 2009/0223751 | A1 * | 9/2009 | Peacock et al. | 187/414 |
| 2010/0287876 | A1 * | 11/2010 | Van Der Meijden et al. | 52/741.1 |
| 2012/0037462 | A1 * | 2/2012 | Urben et al. | 187/401 |

FOREIGN PATENT DOCUMENTS

| | | | | |
|---|---|---|---|---|
| JP | 04243786 | A | * | 8/1992 |
| JP | 04266381 | A | * | 9/1992 |
| JP | 05139656 | A | * | 6/1993 |
| JP | 06156923 | A | * | 6/1994 |
| JP | 11-349252 | A | | 12/1999 |
| JP | 2000-226169 | A | | 8/2000 |

* cited by examiner

METHOD OF INSTALLING AN ELEVATOR

CROSS-REFERENCE TO RELATED APPLICATIONS

This application claims priority under 35 U.S.C. §119(e) to U.S. Provisional Application No. 61/118,560, filed on Nov. 28, 2008, the entirety of which is expressly incorporated herein by reference.

BACKGROUND OF THE INVENTION

1. Field of the Invention

The present invention is directed to a method in the installation of an elevator.

2. Description of Background Art

According to background art, an elevator is installed into the elevator hoistway working from scaffolding installed into the elevator hoistway. As an addition to this, an installation platform temporarily arranged in the elevator hoistway can be used, which can be moved to and fro in the elevator hoistway with a manriding hoist. Additionally, according to the background art, the elevator components that are to be installed are moved into their position using a material hoist. The problems of background art are, among other things, the need to work from installation scaffolding, repetitive driving to and fro with the installation platform, the time consumed in disassembling the installation platform used in the installation, the large number of installation tools, and the total duration of the elevator installation.

SUMMARY OF THE INVENTION

The purpose of the present invention is to eliminate, among other things, the aforementioned drawbacks of background-art solutions. More particularly, the purpose of the present invention is to produce a more efficient method than before in the installation of an elevator. The purpose of the present invention is further to produce one or more of the following advantages, among other things.

a). Installation of the elevator can be performed without scaffolding being installed in the elevator hoistway;
b). A faster/more efficient installation method is achieved;
c). A simpler installation method than before is achieved;
d). An installation method is achieved by means of which the amount of installation tools can be reduced;
e). An installation method is achieved in which a material hoist can be used as a hoisting appliance and a manriding hoist is not needed;
f). The need during installation for up-down movement of the movable platform structure used for the installation can be reduced;
g). The phases needed in the installation can be reduced, e.g. the phase of removing the movable installation platform from the elevator hoistway is not needed;
h). The same hoist, which is used for material hoisting can be used for manriding. Thus, there is no need for two separate hoists for manriding and material hoisting; and
i). A hoist which normally has been regarded as a material hoist not suitable for manriding can be used also for manriding.

The method according to the present invention includes arranging a movable platform structure in a bottom end of an elevator hoistway with a temporary hoisting appliance in the elevator hoistway; lifting the movable platform structure in the elevator hoistway with the temporary hoisting appliance; installing final components of the elevator from the movable platform structure; and installing the final hoisting ropes of the elevator. Other embodiments of the present invention are characterized by what is disclosed in the other claims. Some inventive embodiments are also discussed in the descriptive section and in the drawings of the present application. The inventive content of the application can also be defined differently than in the claims presented below. The inventive content may also consist of several separate inventions, especially if the invention is considered in the light of expressions or implicit sub-tasks or from the point of view of advantages or categories of advantages achieved. In this case, some of the attributes contained in the claims below may be superfluous from the point of view of separate inventive concepts. The features of the various embodiments can be applied within the scope of the basic inventive concept in conjunction with other embodiments.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
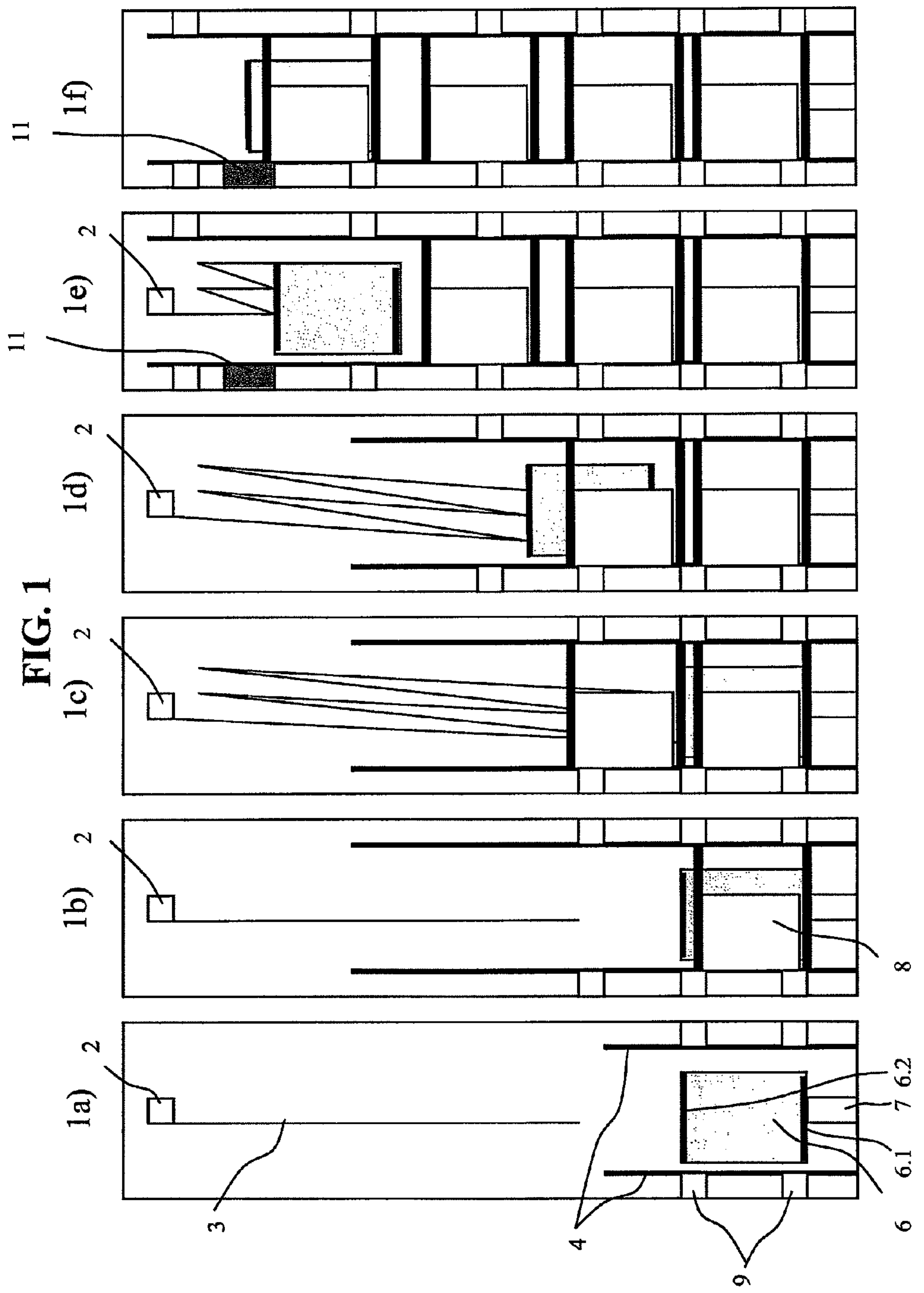
FIG. 1 illustrates the phases of the method according to the present invention for an elevator comprising four floor landings.

The present invention will now be described with reference to the accompanying drawings, wherein the same reference numerals have been used to identify the same or similar elements throughout the several views.

FIGS. 1*a*-1*f* illustrate the elevator to be constructed with the method according to the present invention in the different phases of the method. In the method according to the present invention, an elevator, preferably a passenger elevator, is installed in a residential building or other corresponding building in the elevator hoistway 1 or corresponding space.

FIG. 1*a* illustrates the method phase in which a temporary hoisting appliance 2 is suspended in the elevator hoistway 1, which hoisting appliance is preferably a so-called material hoist, preferably a Minifor hoist or alternatively a Tirak hoist. The hoisting appliance is supported from the top end of the elevator hoistway, preferably on a horizontal beam in the near vicinity of the top end of the elevator hoistway. Objects can be supported, lifted and lowered in the elevator hoistway with the hoisting appliance 2 via the rope 3 of the hoisting appliance. In this phase, the lowermost car guide rail sections, the buffer 7, the electrifications near the bottom end of the elevator hoistway, as well as possibly the lowermost counterweight guide rail sections and the counterweight, if the elevator being constructed is one with a counterweight, are also installed. The presence of all these listed structures is not necessary in all elevator types, so not all the structures are shown in the figure. The hoisting appliance 2 can be used as an aid in the installation of all of these structures. The roping of the hoisting appliance is 1:1 in FIG. 1*a*, but alternatively it can be another roping, e.g. 2:1. Additionally in this method phase, the movable platform structure 6 is arranged in the bottom end of the elevator hoistway 1, preferably only after the elevator components around the platform structure have already been installed, preferably at least the lowermost car guide rail sections 4. The platform structure presented in FIG. 1*b* comprises two levels, 6.1 and 6.2, one above the other, from which it is possible to work during the installation of the elevator. The platform structure 6 is the partly assembled elevator car, of which the aforementioned levels 6.1 and 6.2 that are one above the other later form at least a part of the roof and the floor of the elevator car of the completed elevator. The hoisting appliance 2 can, if necessary, be utilized in moving the movable platform structure 6 into the elevator hoistway and in assembling it. The platform structure 6 preferably also comprises a brake (not shown) corresponding to the guide rails 4 and means (not shown) for activating the brake to make working from the platform structure 6 safe. The brake is not, however, wholly necessary. The brake can be, e.g. a brake controlled by a background art overspeed governor that is triggered by overspeed and/or a separately activated brake for locking the platform structure 6 to the car guide rails 4 with the brake during the time of working from the platform structure 6. The platform structure 6 preferably also comprises guides for guiding the platform structure along the guide rails 4 of the elevator car.

In the phase presented in FIG. 1*b*, the landing door structures 8 of the lowermost floor landing of the elevator hoistway are installed and also, working from the platform structure 6, more particularly from the upper working level 6.1 of the platform structure 6, the next to lowermost car guide rail sections and possibly the counterweight guide rail sections (not shown) are installed into position by means of the hoisting appliance 2. The tightening of the car guide rail sections into their position can also be done from the platform structure 6.

In the method phase illustrated in FIG. 1*c*, the landing door structures 8 of the next to lowermost floor landing are installed working from the platform structure 6. Likewise, in this phase, the movable platform structure 6 is suspended on the hoisting rope 3 of the hoisting appliance 2 for moving the platform structure 6 with the hoisting ratio best suited to the situation, e.g. with the 5:1 hoisting ratio presented in the figure. One benefit of the present invention is that the same hoist, which is used for material hoisting can be used for manriding. This is possible by increasing the hoisting capacity of the hoist by reconfiguring the roping ratio of the hoist from one ratio (e.g. 1:1) to another (e.g. 1:5). Thus, the car/working platform structure 6 can be raised/lowered in the hoistway with the same hoist which can be used for hoisting material. Thus, there is no need for two separate hoists for manriding and material hoisting. Also, thus a hoist that normally has been regarded as a material hoist not suitable for man riding can be used also for manriding. The above described ratio change for enabling the use of a material hoist for manriding may include a separate invention. The hoisting appliance 2 is preferably of a portable type. For this purpose, it can comprise a handle and be light-weight. This purpose is also served by the fact that the aforesaid hoisting ratio change for the hoisting appliance need not be dimensioned to carry the whole weight of the platform structure in a 1:1 ratio. The hoisting appliance 2 preferably can be such that it has in normal and safe use capacity to lift, when configured to 1:1 ratio, 100-500 kg, preferably less than 500 kg, more preferably less than 300 kg. A commercially available lift can be used as the hoisting appliance 2, for example, a Minifor, dimensioned to safely lift the above-mentioned load (i.e. the nominal capacity of the hoisting appliance is designed to lift the above-mentioned load).

In the method phase illustrated in FIG. 1*d*, the platform structure 6 is lifted upwards in the elevator hoistway 1 by controlling the hoisting appliance 2 safely from the floor landing. After this, the platform structure can be locked with the brake, if so desired, to the car guide rails from the floor landing, but this is not necessary. Moving next onto the platform structure 6, installation of the structures of the elevator is continued from the platform structure. For example, installation of the electrifications of the elevator hoistway and installation of the guide rail fixings 9 is continued now on the higher level, after moving there. In this way, the structures of the elevator can be installed in sequence from the bottom upwards. Likewise the door structures of the third lowermost landing are installed from the levels 6.1 and/or 6.2 of the platform structure 6 and or from the floor landing. In this method phase also the platform structure is lifted to the height from where the uppermost car guide rail sections (and, if necessary, the topmost section of the counterweight guide rails) can be installed into position, in the installation of which a separate hoist can, if necessary, be used as an addition.

In the method phase illustrated in FIG. 1*e*, the platform structure 6 has been lifted to the top end of the elevator hoistway. The structures of the elevator below the platform structure 6 have been installed in earlier phases to the desired degree of completion in sequence from the bottom upwards. In this phase, the actual final hoisting machine 11 of the elevator as well as the structures of the top end of the elevator, e.g. the electrifications of the hoisting machine 11 and the electrifications of the top end of the elevator hoistway 1, are installed in the top end of the elevator hoistway 1 from the platform structure 6. The final hoisting machine 11 of the elevator preferably comprises an electric motor and a traction sheave. The installation of it is preferably performed such that the hoisting machine 11 is in some earlier phase, when the platform structure 6 is at the lowermost point of the floor landing, e.g. in phase 1*c*, rolled on a trolley or corresponding to the lower level 6.1 of the platform structure 6, on which level the hoisting machine 11 is moved upwards with the level 6 as the installation progresses. In phase le, the level 6.1 is driven to a position that is level with the topmost floor landing and it is rolled onto the floor landing. After this, the platform structure 6 is lowered such that the level 6.2 is level with the floor landing in question and the hoisting machine is rolled onto the level 6.2, from where the hoisting machine 11 is installed into its final position in the elevator hoistway 1. After this, the final hoisting roping (not shown) of the elevator is installed, which is arranged to bear the platform structure 6, which platform structure will later form at least a part of the final elevator car. To make this possible it can be necessary to move the platform structure 6 and/or to change its structure to enable the roping, e.g. in order to arrange the suspension. It is possible to add, e.g. rope pulleys to the platform structure 6 if the final elevator is roped with other than a 1:1 hoisting ratio. When roping, it is also possible to drop the hoisting ropes into the hoistway and to guide the hoisting ropes to pass via the diverting pulleys of the bottom end of the hoistway and/or to their fixings by working below the platform structure 6, e.g.

on the bottom of the hoistway. When the platform structure is supported with the final hoisting roping (not shown) the hoisting appliance 2 and the rope 3 are removed.

In the method phase illustrated in FIG. 1*e*, the platform structure 6 can be moved with the final hoisting machine 11 and hoisting roping of the elevator. The platform structure 6 can be moved in the elevator hoistway and installation of the elevator hoistway can be finished if it is necessary. The platform structure 6 can be completed into the elevator car in this phase. For the purposes of the finishing, it is advantageous to drive the platform structure 6 to the lowermost floor landing or to another preferred floor landing, from where it is easy to deliver the finishing material to the platform structure 6. In the finishing, at least a part of the following can be installed in the platform structure 6: the car door structures, the wall panels, the lights, the electrifications, the call panel, the final floor panel, the final ceiling panel, etc.

In the method, the platform structure 6 is lifted according to need in steps upwards as the construction work progresses and the structures of the elevator hoistway are constructed from the bottom upwards. The purpose is to get the most essential structures of the elevator hoistway to a sufficient degree of completion that enables use with only one lift. The lifts are continued until the platform structure 6 is in the top end of the elevator hoistway and the desired structures of the elevator, preferably at least the guide rails, doors and electrifications, are installed in the elevator hoistway essentially to the top and essentially to completion. The method described above is suited in principle to an elevator of any height whatsoever. The number of stops of the platform structure 6 depends on the number of floor levels of the elevator to be constructed and the travel height. The method is very well suited to low-rise elevators, particularly to an elevator of 2-4 floor landings. When the elevator is 2 or 3 floor landings, the elevator can manage with, for instance, 1-3 stops. In the case of higher-rise elevators the platform structure is stopped a number of times. Most preferably, the elevator to be constructed is an elevator of two or three floor landings, in which case the travel height does not become disadvantageously large nor does the amount of components to be installed and moved upwards with the platform structure become disadvantageously large.

Figure 2:
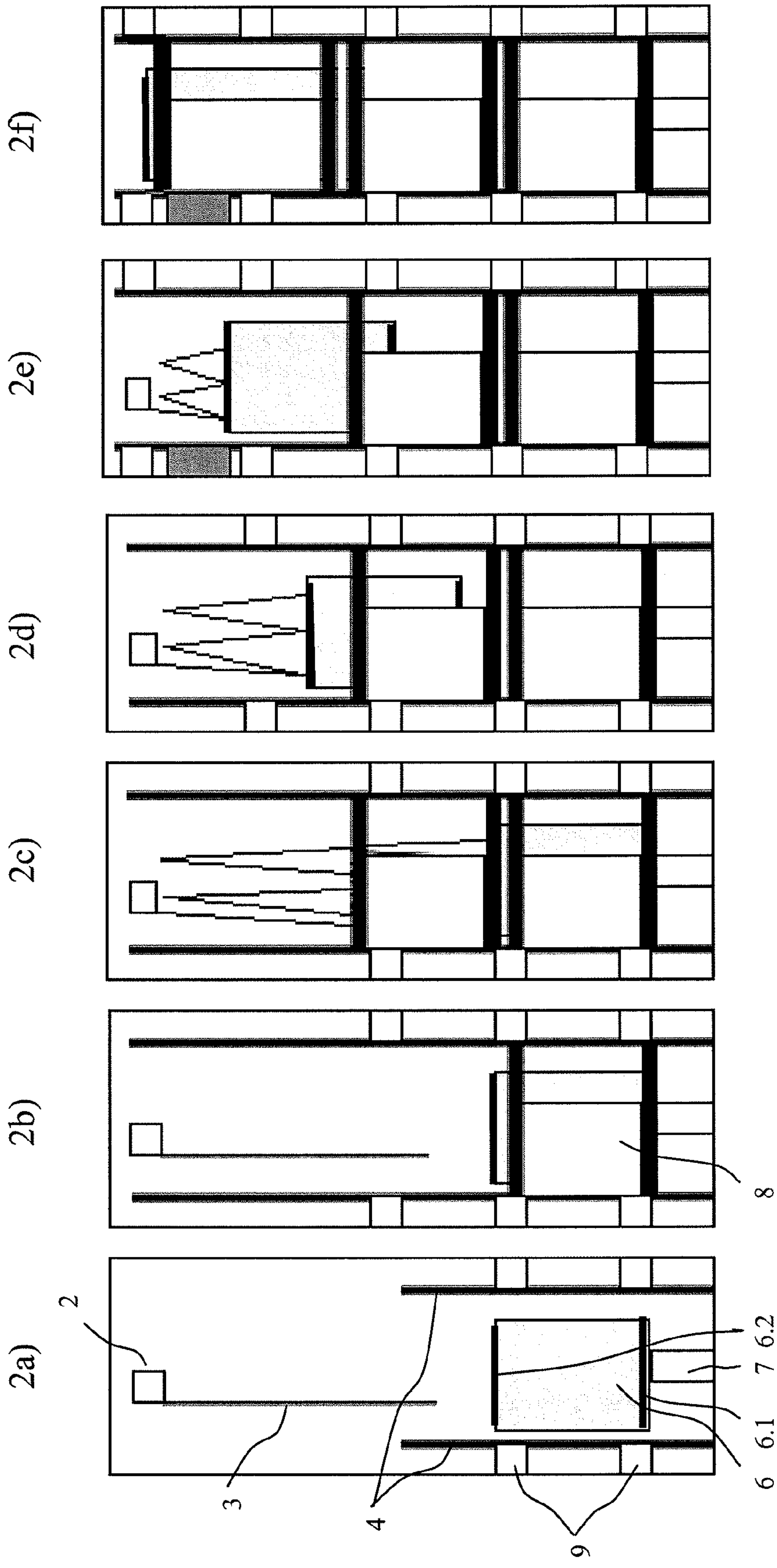
FIG. 2 illustrates the phases of the method according to the present invention for an elevator comprising three floor landings.

FIG. 2 illustrates the phases of the construction method of a three-floor elevator in which the method phases 2*a*-2*c* correspond to the method phases 1*a*-1*c* described above. Owing to the shorter travel height of the elevator, one difference is that next lower guide rail sections can be arranged to reach up to the top part of the elevator hoistway. For the same reason also, the difference of the method phase 2*d* from the method phase 1*d* is that it is necessary to ascend a shorter distance and install fewer elevator components by the amount of one floor. Also the guide rail sections no longer need to be installed in this phase. The method phases 2*e*-2*f* correspond to the method phases 1*e*-1*f* described above. In FIG. 2*f* the platform structure 6 is shown in its highest possible position after the installation of the final machine and ropes, in which position the elevator car of the final elevator is at the height of the topmost floor landing.

When the elevator being constructed is an elevator of two floor levels, the elevator can be constructed with a method corresponding in principle to that described above. The difference is that fewer lifts are needed. In this case, the intermediate phases can be omitted because there are fewer structures between the topmost and the bottommost floor landings. The structures of the elevator are assembled in the manner corresponding to FIGS. 1*a*-1*c* or 2*a*-2*c*. The lengths of the guide rails of course may need to be fitted to be suited to the length of the elevator hoistway, e.g. by joining a shorter guide rail section as an extension to a pre-installed guide rail section so that the combined length of the guide rail sections is suited to the elevator hoistway. In this phase, the hoisting machine can be installed from the platform structure 6, e.g. from the upper level 6.2 of the platform structure in the manner described earlier. After this, the final roping of the elevator is reeved and the platform structure 6 is suspended from the roping.

In all the embodiments of the method according to the present invention, the guide rails 4 of the elevator car are installed into position from the platform structure 6 and the platform structure 6 is moved upwards in steps along the guide rails 4 already installed. Of course, the lowermost guide rails 4 can be installed from the bottom of the elevator hoistway already before the assembly of the platform structure 6 in the elevator hoistway 1. After the platform structure 6 has been moved higher in the elevator hoistway, the guide rail fixings 9 are added from the platform structure 6 for as high as can be reached from the platform structure 6, after which it is safe to move the platform structure 6 that much higher guided by the guide rails 4. This procedure is followed with the platform structure stopped and stationary at each stopping height. Correspondingly the other elevator components, e.g. the electrifications of the elevator and the door structures, are installed with the same principle. Thus the construction of the elevator proceeds to a certain degree of completion in sequence from the bottom upwards with one lift. In this way the platform structure 6 is not driven to and fro repeatedly upwards-downwards in the elevator hoistway. When lifting the platform structure 6 from the bottom end of the elevator hoistway 1 to the top end of the elevator hoistway 1, the platform structure 6 is lifted in steps from the bottom end of the elevator hoistway 1 to the top end without lowering the platform structure 6 back to the bottom of the hoistway in between, and preferably without lowering the platform structure downwards essentially at all. The aforementioned degree of completion is preferably the degree of completion in which the components of the final elevator have been installed in the elevator hoistway essentially to completion, which components are at least the car guide rails, preferably also the landing doors and/or the electrifications of the elevator hoistway.

The final elevator car refers to the elevator car that operates as the elevator car of the completed elevator manufactured with the method, e.g. for the transfer of people. The final hoisting machine refers to the hoisting machine with which, together with the final hoisting roping, the final elevator car of the completed elevator is moved.

Figure 3:
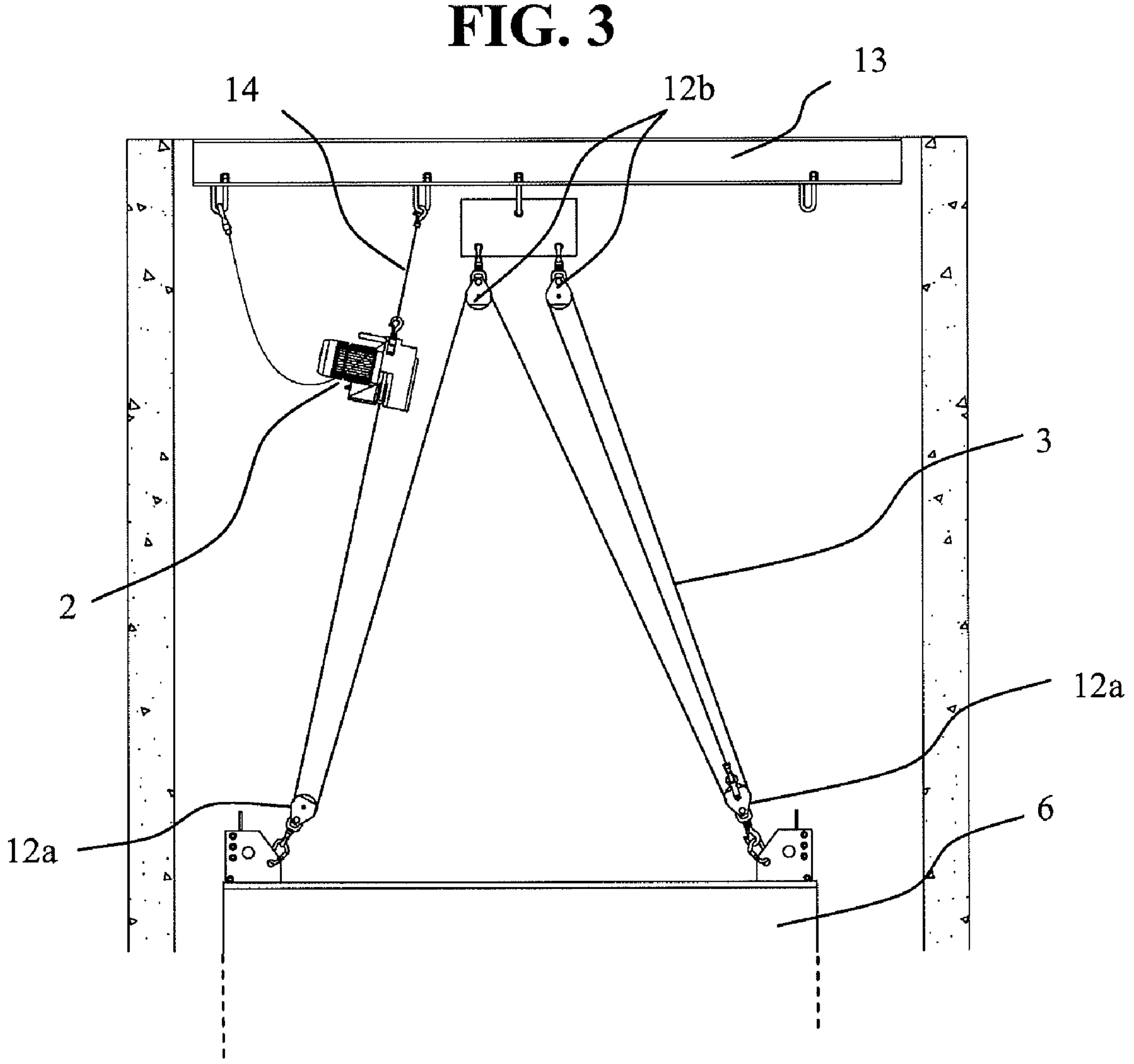
FIG. 3 illustrates the suspension arrangement of a preferred platform structure utilized in the method according to the present invention.

FIG. 3 illustrates a preferred support of the hoist 2 on the elevator hoistway and the suspension of the platform structure 6 in the method phases 1*c*-1*e* of FIG. 1 and in the method phases 2*c*-2*e* of FIG. 2 in the methods presented, in which the support of the hoist on the elevator hoistway and the suspension of the platform structure 6 from the hoist 2 is presented only by way of reference. In FIG. 3 the hoisting appliance 2 is supported on a beam in the vicinity of the top end of the elevator hoistway from a short rope 14. The hoisting appliance 2 moves the hoisting rope 3 by pulling it through itself. The hoisting rope coils onto the reel (not shown) as the platform structure 6 is lifted and uncoils from the reel as the platform structure 6 is lowered. The reel can be disposed on the platform structure 6 or on the topmost floor level or in another suitable place. The rope 3 is controlled to pass via the diverting pulleys 12*a* fixed to the platform structure 6 and the diverting pulleys 12*b* fixed to the beam 13 in order to achieve a sufficiently large hoisting ratio. In this way the platform structure 6 can be moved with a small material hoist such as with a Minifor or alternatively with a Tirak. The platform structure 6 is raised in steps and the structures of the elevator are installed from the positioned platform structure. It is preferred that during the movement of the platform structure there are no people on the platform structure. The hoisting appliance 2 is preferably remote-controlled from, e.g. a floor landing. When the platform structure 6 is stopped for the installation time at the desired height in the elevator hoistway, the aforementioned brake fixed to the platform structure 6 can be activated.

It is obvious to the one having ordinary skill in the art that the present invention is not limited to the embodiments described above, in which the present invention is described using examples, but that many adaptations and different embodiments of the present invention are possible within the scope of the inventive concept defined by the claims presented below. Thus it is obvious that the method according to the present invention can also be used such that the platform structure 6 is of one level. It is also obvious that the platform structure 6 does not necessarily need to form part of the final elevator car but instead the platform structure 6 can be some other temporary working platform according to background art. It is also obvious that the hoisting rope 3 of the hoist 2 can be a metal rope, a belt, a chain, etc.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of installing an elevator, said method comprising the steps of:

arranging a movable platform structure in a bottom end of an elevator hoistway with a temporary hoisting appliance in the elevator hoistway;

lifting the movable platform structure in the elevator hoistway with the temporary hoisting appliance;

installing final components of the elevator from the movable platform structure;

installing a final hoisting machine; and installing final hoisting ropes of the elevator, wherein the movable platform structure is a final elevator car or at least a part of a final elevator car;

wherein said step of installing the final hoisting machine comprises:

moving the final hoisting machine to lower level of the movable platform structure;

moving the movable platform structure upwards in the elevator hoistway such that the lower level of the movable platform structure is level with a floor of a floor landing;

moving the final hoisting machine to the floor landing;

moving the movable platform structure downwards in the elevator hoistway such that an upper level of the movable platform structure is level with the floor landing where the final hoisting machine is located;

moving the final hoisting machine to the upper level of the platform structure; and installing the final hoisting machine into position in the elevator hoistway from the movable platform structure.

2. The method according to claim 1, further comprising the step of installing a final hoisting machine of the elevator in a top end of the elevator hoistway from the movable platform structure.

3. The method according to claim 1, wherein the final hoisting ropes of the elevator are installed such that the movable platform structure can be moved in the elevator hoistway with the final hoisting ropes of the elevator.

4. The method according to claim 1, wherein the movable platform structure comprises two levels.

5. The method according to claim 1, further comprising the step of, when lifting the movable platform structure from the bottom end of the elevator hoistway to a top end of the elevator hoistway, installing the final components of the elevator from the movable platform structure in sequence from the bottom upwards.

6. The method according to claim 1, further comprising the steps of, when lifting the movable platform structure from the bottom end of the elevator hoistway to a top end of the elevator hoistway, lifting the movable platform structure in steps upwards and installing the final components of the elevator from the movable platform structure in sequence from the bottom upwards.

7. The method according to claim 1, further comprising the steps of installing car guide rails of the elevator from the platform structure and moving the movable platform structure upwards along said guide rails already installed.

8. The method according to claim 1, wherein the method further comprises the step of installing at least some of the following final components of the elevator from the movable platform structure:

landing door(s);

electrifications of the elevator hoistway;

guide rail fixings; and car guide rails and/or counterweight guide rails.

9. The method according to claim 1, wherein the movable platform structure is a final elevator car, or at least a part of a final elevator car, and comprises a lower level and a higher level, the lower level forming at least a part of a floor of the final elevator car and the higher level forming at least a part of a roof of the final elevator car, and the final components of the elevator are installed from the lower level and/or the higher level.

10. The method according to claim 1, further comprising the step of partly installing structures of the hoistway of the elevator in sequence from the bottom upwards with one lift, so that at least the final components of the final elevator are installed in the elevator hoistway essentially to completion, said final components are at least the car guide rails, the counterweight guide rails and/or the landing doors and/or the electrifications of the elevator hoistway.

11. The method according to claim 1, further comprising the step of suspending the movable platform structure on a hoisting rope of the temporary hoisting appliance supported from a top end of the elevator hoistway.

12. The method according to claim 11, further comprising the step of arranging the temporary hoisting appliance to support the movable platform structure with a suspension ratio of 2:1, 3:1, 4:1, 5:1, 6:1, 7:1, 8:1, 9:1 or 10:1.

13. The method according to claim 1, further comprising the steps of:

suspending the movable platform structure on a hoisting rope of the temporary hoisting appliance supported from a top end of the elevator hoistway; and before said step of suspending, installing the final components of the elevator in the proximity of the bottom end of the elevator hoistway by means of the temporary hoisting appliance supported from a top end of the elevator hoistway, said final components being at least some of the following:

a buffer;

lowermost car guide rail sections; and lowermost counterweight guide rail sections.

14. The method according to claim 1, further comprising the step of, when installing the final components of the elevator in the proximity of the bottom end of the elevator hoistway by means of the hoisting appliance, lifting the final components with the hoisting appliance, such that the hoisting appliance supports the final components of the elevator with a suspension ratio of 1:1 or 2:1.

15. The method according to claim 1, further comprising the steps of:

when installing the final components of the elevator, lifting the final components of the elevator with the temporary hoisting appliance and supporting the final components with the temporary hoisting appliance with a first suspension ratio; and after said step of supporting with a first suspension ratio, suspending the movable platform structure on a hoisting rope of the temporary hoisting appliance supported from a top end of the elevator hoistway such that the hoisting appliance supports the movable platform structure with a second suspension ratio, the second suspension ratio being greater than the first suspension ratio.

16. The method according to claim 1, wherein the movable platform structure comprises a brake corresponding to the car guide rails for preventing overspeed of the movable platform structure.

17. The method according to claim 16, wherein the movable platform structure comprises an actuator used by a fitter for using the brake corresponding to the car guide rails.

18. The method according to claim 1, further comprising the step of using a final hoisting machine of the elevator and the final hoisting ropes of the elevator to move the movable platform structure during a phase in which the installation of the elevator is finished from the movable platform structure.

19. The method according to claim 1, wherein at least some of the following steps are performed without using scaffolding on the inside of the elevator hoistway:

installing a final hoisting machine of the elevator;

installing car guide rails;

installing electrifications running in the vertical direction of the elevator hoistway; and installing landing door structures of the upper floor landings.

20. The method according to claim 1, further comprising the step of forming the elevator to comprise 2 or 3 floors.

21. The method according to claim 1, further comprising the steps of:

arranging the movable platform structure to be moved along car guide rails in the elevator hoistway; and locking the movable platform structure to the car guide rails with a brake during working from the movable platform structure.

22. The method according to claim 1, further comprising the step of moving the final components to be installed along with the movable platform structure to a height at which the final components will be installed in the elevator hoistway.

23. The method according to claim 1, wherein the final hoisting machine comprising an electric motor and a traction sheave.

24. The method according to claim 1, wherein the temporary hoisting appliance is a portable hoist in the form of a Minifor hoist.

25. The method according to claim 1, wherein the temporary hoisting appliance is a wire rope hoist.

26. The method according to claim 1, wherein the temporary hoisting appliance has a 1:1 lifting capacity of 100-500 kg.

27. The method according to claim 1, wherein the step of installing the final hoisting ropes of the elevator is performed without lowering the movable platform structure.

28. A method of installing an elevator, said method comprising the steps of:

arranging a movable platform structure in a bottom end of an elevator hoistway with a temporary hoisting appliance in the elevator hoistway;

lifting the movable platform structure in the elevator hoistway with the temporary hoisting appliance;

installing final components of the elevator from the movable platform structure;

installing the final hoisting machine;

installing final hoisting ropes of the elevator;

when installing the final components of the elevator, lifting the final components of the elevator with the temporary hoisting appliance and supporting the final components with the temporary hoisting appliance with a first suspension ratio; and after said step of supporting with a first suspension ratio, suspending the movable platform structure on a hoisting rope of the temporary hoisting appliance supported from a top end of the elevator hoistway such that the hoisting appliance supports the movable platform structure with a second suspension ratio, the second suspension ratio being greater than the first suspension ratio, wherein said step of installing the final hoisting machine comprises:

moving the final hoisting machine to lower level of the movable platform structure:

moving the movable platform structure upwards in the elevator hoistway such that the lower level of the movable platform structure is level with a floor of a floor landing;

moving the final hoisting machine to the floor landing;

moving the movable platform structure downwards in the elevator hoistway such that an upper level of the movable platform structure is level with the floor landing where the final hoisting machine is located;

moving the final hoisting machine to the upper level of the platform structure; and installing the final hoisting machine into position in the elevator hoistway from the movable platform structure.

29. The method according to claim 28, wherein the step of installing the final hoisting ropes of the elevator is performed without lowering the movable platform structure.

* * * * *